United States Patent [19]

Patel et al.

[11] Patent Number: 5,521,262
[45] Date of Patent: May 28, 1996

[54] LIQUID EPOXY ADHESIVE COMPOSITION HAVING STABLE ELASTOMERIC PHASE

[75] Inventors: Pinakin M. Patel, Wayne; Walter W. Stottmeister, West Caldwell, both of N.J.

[73] Assignee: Harcros Chemicals Inc., Belleville, N.J.

[21] Appl. No.: 344,495

[22] Filed: Nov. 23, 1994

Related U.S. Application Data

[63] Continuation-in-part of Ser. No. 971,517, Nov. 3, 1992, abandoned.
[51] Int. Cl.⁶ .................. C08G 18/58; C08G 18/65; C08G 18/63
[52] U.S. Cl. .................................... 525/528; 528/73
[58] Field of Search ................ 525/528; 528/73

[56] References Cited

U.S. PATENT DOCUMENTS

| | | | |
|---|---|---|---|
| 4,036,906 | 7/1977 | Finelli | 528/73 |
| 4,568,705 | 2/1986 | Grace | 525/11 |
| 4,613,660 | 9/1986 | Goel | 528/73 |
| 4,870,142 | 9/1989 | Czerwiniski | 525/528 |

*Primary Examiner*—Melvyn I. Marquis
*Assistant Examiner*—D. R. Wilson
*Attorney, Agent, or Firm*—Lerner, David, Littenberg, Krumholz & Mentlik

[57] ABSTRACT

A high strength curable resin composition of an epoxy compound having an oxirane group and an elastomer grafted polyol covalently linked to the epoxy compound other than by the oxirane group.

14 Claims, No Drawings

LIQUID EPOXY ADHESIVE COMPOSITION HAVING STABLE ELASTOMERIC PHASE

This is a Continuation-In-Part of application Ser. No. 07/971,517, filed Nov. 3, 1992, now abandoned.

BACKGROUND OF THE INVENTION

The present invention relates to curable epoxy resin compositions having improved shear strength, peel strength, flexibility and impact properties. The epoxy resin compositions incorporate an epoxy compound having a terminal oxirane group, and the improved strength and flexibility is achieved by covalently linking an elastomer grafted polyol to the epoxy compound other than by the terminal oxirane group. In particular, the present invention relates to curable epoxy resin compositions containing hydroxyl groups along the backbone to which elastomer grafted polyols have been covalently linked by reacting the two compounds with a diisocyanate to form a diurethane linkage between the hydroxyl group of the epoxy compound and a polyol hydroxyl group of the elastomer grafted polyol.

Epoxy resins are curable adhesive compositions based on organic compounds having one or more terminal or pendent oxirane groups. The resins are typically cured by reacting the oxirane group with a primary amine. Epoxy resin adhesives and coatings are useful because of the relative ease with which they can be converted to cured thermoset products that are strong and resistant to chemical environments. Conventional epoxy resin adhesive and coatings, however, have high glass transition temperatures and are brittle and tend to be susceptible to mechanical and thermal shock.

To overcome this deficiency, elastomers have been incorporated into curable epoxy resin compositions. Typically, an elastomeric phase is incorporated into the epoxy resin, either by direct blending or by the formation in situ of agglomerate particles upon addition of the curing agent. The elastomeric phase usually requires stabilizing to maintain a uniform blend with the epoxy resin.

For example, Marubashi, U.S. Pat. No. 4,170,613 discloses an epoxy resin blended with a copolymer of chloroprene with a glycidyl ester. The chloroprene portion of the copolymer represents an elastomer to be dispersed in the epoxy resin, while the glycidyl ester is a "stabilizer" covalently bonded to the elastomer and soluble in the epoxy resin.

Adam, U.S. Pat. No. 4,524,181, also discloses an epoxy resin blended with an elastomer that is covalently linked to a stabilizer that is soluble in the epoxy resin. This patent mentions U.S. Pat. No. 3,496,250 as teaching the blending of an acrylonitrile butadiene-styrene graft polymer into an epoxy resin to provide flexibility, shear strength and impact characteristics to the cured resin.

Cuscurida, U.S. Pat. No. 4,539,378, and Hayes, U.S. Pat. No. 5,059,641, disclose acrylonitrile/styrene graft polyols copolymerized with epoxy compounds at the terminal oxirane group of the epoxy compound. This does not provide a curable epoxy resin because all of the oxirane groups are reacted with the graft polyol. Similarly, Huybrechts, U.S. Pat. No. 4,564,648, discloses an acrylic ester graft epoxy formed by copolymerization of an epoxy resin with acrylate monomers. Again, this does not result in the formation of a curable epoxy resin because all of the terminal oxirane groups are reacted with the acrylate monomers.

Morita, U.S. Pat. No. 5,082,891, discloses a curable epoxy resin having cured silicone rubber particles uniformly dispersed therein. The compound can also include a second, aliphatically unsaturated, epoxy compound covalently linked to an aliphatically unsaturated aromatic compound by an organohydrogen-polysiloxane crosslinking agent. This covalently linked ingredient is disclosed as compatibilizing the silicone rubber particles with the curable epoxy resin.

One drawback to the elastomeric phases incorporated into prior art epoxy resin compositions is that the stability and uniformity of the phase is dependent upon the curing agent and temperature. This is particularly a problem with the in situ formation of elastomeric agglomerates.

There remains a need for curable epoxy resin compositions capable of forming uniform, stable elastomeric phases when cured that provide improved peel strength, shear strength, flexibility and impact characteristics when cured.

SUMMARY OF THE INVENTION

It has now been discovered that the cured strength, flexibility and impact characteristics of curable epoxy resins can be improved by incorporating into curable epoxy resin compositions elastomer grafted polyols that are covalently linked to an epoxy compound other than by the oxirane group. Covalently linking elastomer grafted polyols to epoxy compounds forms a uniform, stable elastomeric phase prior to curing that remains uniform and stable after the addition of the curing agent over a wide range of curing temperatures. This provides a cured resin having increased flexibility, strength and impact characteristics.

Therefore, in accordance with the present invention, there is provided a high strength curable resin composition of an epoxy compound having an oxirane group and an elastomer grafted polyol covalently linked to the epoxy compound other than by the oxirane group. Preferred aspects of the present embodiment utilize a hydroxyl-containing epoxy resin that is covalently linked to the elastomer grafted polyol with a diisocyanate compound that forms a diurethane linkage between the hydroxyl group of the epoxy resin and a polyol hydroxyl group of the elastomer grafted polyol. Particularly preferred elastomer grafted polyols are the acrylonitrile/styrene elastomer grafted polyols ordinarily used in the preparation of polyurethane foams and solid urethane elastomers.

The curable epoxy resin compositions of the present invention can be prepared by a block polymerization method by first reacting a bi-functional linker compound with the elastomer grafted polyols and then reacting the bi-functional linker compound modified elastomer grafted polyol with the epoxy compound. Alternatively, the epoxy compound, elastomer grafted polyol and bi-functional linker compound can be randomly reacted together in a single reaction mixture to form the curable epoxy resin compositions of the present invention.

The epoxy resin compositions of the present invention possess uniform, stable elastomeric phases that remain uniform and stable when cured by conventional means such as by reacting the terminal oxirane groups with primary, secondary and tertiary amines, acid anhydrides, carboxylic acids, hydroxyls, phenolics, imidazoles, Lewis acid complexes, dicyanodiamide, polyamides, amidoamines, and the like. When cured, the epoxy resin compositions exhibit high T-peel, lap shear and impact properties.

DETAILED DESCRIPTION OF THE PREFERRED EMBODIMENT

The curable epoxy resin compositions of the present invention are prepared by covalently linking an elastomer grafted polyol to an epoxy compound having an oxirane group other than by the oxirane group. The covalent linkage between the epoxy compound and the elastomer grafted polyol is obtained by reacting the two compounds with a bi-functional linker compound.

Epoxy compounds for use with the present invention should have molecular weights low enough to ensure that the resulting resin composition is liquid at room temperature. This result can be obtained by using epoxy compounds having a number-average molecular weight less than 1,000, and preferably less than 500.

Epoxy compounds suitable for use with the present invention have one or more oxirane groups and either a point of aliphatic unsaturation or a substituent group capable of reacting with a functional group of the bi-functional linker compound so that a covalent bond between the epoxy compound and the linker compound is formed. The epoxy compound and the linker compound should be selected so that the functional group of the linker compound reacts preferentially with the point of unsaturation or the substituent group of the epoxy compound instead of with the oxirane group.

Preferred epoxy compounds react with a functional group of the bi-functional linker compound via a substituent group other than the oxirane group rather than via a point of unsaturation. The preferred substituent group is a hydroxyl group because most commercially available epoxy compounds contain hydroxyl substituents.

Epoxy compounds are typically formed by the reaction of epichlorohydrin with a hydroxyl group-containing compound. Epoxy compounds having hydroxyl groups are defined as including compounds having unreacted hydroxyl groups and compounds in which the glycidyl, or oxirane, groups have reacted intramolecularly to open and form a hydroxyl group. For example, EPON 828, manufactured by Shell Chemical, is a diglycidyl ether of Bisphenol A. Therefore, this compound would appear to contain no hydroxyl groups. However, up to 20% of the glycidyl groups typically open to form hydroxyl groups. Such a compound is suitable for use with the present invention.

Epoxy compounds having more than one point of unsaturation or substituent group, or both, capable of reacting with a functional group of the bi-functional linker compound are also suitable for use with the present invention. Therefore, the preferred epoxy compounds also include epoxy compounds having more than one hydroxyl substituent. When more than one point of unsaturation or substituent group, or both, are present, more than one elastomer grafted polyol will covalently link to the epoxy compound.

The hydroxyl-substituted epoxy compounds suitable for use in the epoxy resin composition of the invention have a glass transition temperature, $T_g$, from below room temperature to about 150° C. Included are monomeric and polymeric type compounds that can be branched or straight-chain aliphatic, cycloaliphatic, aromatic or heterocyclic (having O and/or N heteroatoms). The compounds will typically have an epoxy functionality of from 1 to 6, preferably 1 to 3. A wide variety of commercial epoxy resins is available and listed in "Handbook of Epoxy Resins" by Lee and Neville, McGraw-Hill Book Company, New York (1967) and "Epoxy Resin Technology" by P. F. Bruins, John Wiley and Sons, New York (1968).

A preferred class of hydroxyl-substituted epoxy compounds are the cyclic ethers, particularly glycidyl ethers of diphenols, which provide superior toughness properties to the cured resin composition. The most preferred glycidyl ethers of diphenols are glycidyl ethers of Bisphenol A.

Elastomer grafted polyols suitable for use with the present invention may range in number-average molecular weight from about 400 to about 6,500. The grafted polyols are commercially available and prepared by polymerizing an ethylenically unsaturated monomer or mixture of monomers in a polyol mixture combining polyols containing from two to eight, and preferably from three to six, hydroxyl groups. Non-grafted polyols may also be post-added.

Suitable ethylenically unsaturated monomers, and the elastomer grafted polyols prepared therefrom are listed in Grace, U.S. Pat. No. 4,568,705. Preferred monomers and mixtures of monomers include acrylonitrile, styrene, vinyl, allyl and butadiene monomers and mixtures thereof, and others as listed in Brandrup and Immergut, *Polymer Handbook*. (Third Ed., John Wiley & Sons, New York 1989). Therefore, preferred elastomer grafted polyols include polyacrylonitrile grafted polyols and acrylonitrile/styrene copolymer grafted polyols.

Acrylonitrile/styrene copolymer grafted polyols are most preferred. Among the acrylonitrile/styrene copolymer grafted polyols, an acrylonitrile/styrene ratio of about 1:1 is preferred. An increase in the ratio of acrylonitrile results in higher temperature performance. Commercially available acrylonitrile/styrene copolymer grafted polyols include the NIAX series from Union Carbide (now ARCO) and the PLURACOL series from BASF. The preferred members of the NIAX series include NIAX 31–45, NIAX 34–45, NIAX 31–28, NIAX 34–28, NIAX 32–10, NIAX 32–33 and NIAX 24–32. The preferred members of the PLURACOL series include PLURACOL 973, PLURACOL 994 LV, PLURACOL 637, PLURACOL 1001, PLURACOL 1002, PLURACOL 1003, PLURACOL 1117 and PLURACOL 1028.

For purposes of the present invention, bi-functional linker compounds are defined as possessing two or more reactive functional groups. The linker compound therefore includes by definition multi-functional linker compounds capable of covalently linking more than one epoxy compound or more than one elastomer grafted polyol.

The bi-functional linker compound includes a first functional group capable of reacting with the point of aliphatic unsaturation of the epoxy compound or a substituent group of the epoxy compound other than the terminal oxirane group, so that a covalent bond between the epoxy compound and the linker compound is formed. The bi-functional linker compound also includes a second functional group capable of reacting with a polyol hydroxyl group of the elastomer grafted polyol so that a covalent bond between the linker compound and the elastomer grafted polyol is formed. The second functional group is preferably an isocyanate group capable of forming a urethane linkage with the polyol hydroxyl group. When the bi-functional linker compound is reacted with a hydroxyl-substituted epoxy compound, the first functional group is also preferably an isocyanate group capable of forming a urethane linkage with the hydroxyl substituent of the epoxy compound.

Therefore, in accordance with preferred aspects of the present invention, in which elastomer grafted polyols and hydroxyl-substituted epoxy compounds are covalently linked, the bi-functional linker compound is preferably a compound having an isocyanate functionality of two or greater. Polymer isocyanates are available having an isocyanate functionality up to about 2.8 or 2.9. However, of the isocyanate bi-functional linker compounds, diisocyanates are preferred. Diisocyanate linker compounds form diurethane linkages between the hydroxyl-substituted epoxy compound and the elastomer grafted polyols.

Diisocyanates and polymer isocyanates suitable for use with the present invention include compounds having the formula:

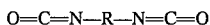
O=C=N—R—N=C=O in which R is selected from branched or straight-chain alkyl, cycloalkyl, aryl, alkylaryl, heteroaryl (having O and/or N heteroatoms) and polymeric isocyanate groups containing up to 25 carbon atoms. Preferred diisocyanate compounds include Toluene Diisocyanate (TDI), Diphenyl Methane Diisocyanate (MDI) carbodiimide modified MDI, polymeric MDI, 1,6-Hexamethylene Diisocyanate, Biuret of 1,6-Hexamethylene Diisocyanate, Isophorone Diisocyanate, Trimethyl Hexamethylene Diisocyanate, Metaphenylene Diisocyanate, $H_{12}$ MDI (saturated MDI), Naphthalene Diisocyanate, Tetramethylxylene Diisocyanate (TMXDI) and Dimethyldiphenylmethane Diisocyanate (DMMDI) and the like. The most preferred diisocyanate is TDI.

The epoxy resin composition of the present invention can be block polymerized by first reacting the bi-functional linker compound with the elastomer grafted polyol and then reacting the bi-functional linker capped modified elastomer grafted polyol with the epoxy compound. A reaction mixture is first formed of one mole of the elastomer grafted polyol and two moles of the bi-functional linker compound that is liquid at room temperature, so that a reaction solvent is not required. The reaction proceeds slowly at room temperature, therefore, the reaction mixture is preferably heated to between 50° C. and 150° C. so that the reaction is completed within one to four hours. Up to about 0.5 parts by weight of a stabilizer such as benzoyl chloride is preferably added to the reaction mixture to neutralize any residual catalyst in the elastomer grafted polyol that would cause crosslinking of the polyol upon heating of the reaction mixture.

The resulting bi-functional linker compound modified elastomer grafted polyol is liquid at room temperature. A second reaction mixture is formed by adding the epoxy compound to this material, which remains liquid at room temperature, so that a reaction solvent is again not required. This reaction also proceeds slowly at room temperature; therefore, the second reaction mixture is also preferably heated to between 50° C. and 150° C. so that the reaction is completed within about one to about six hours. The second reaction mixture should be heated no higher than 180° C., above which epoxy oxiranes become reactive, and preferably not above 150° C.

Random polymerization of the epoxy resin composition of the present invention may be formed by reacting the epoxy compound, elastomer grafted polyol and bi-functional linker compound in a single reaction mixture. The three compounds form a liquid reaction mixture at room temperature; therefore, a reaction solvent is also not needed for this mode of preparation. This reaction also proceeds slowly at room temperature; therefore, the reaction mixture is also preferably heated to between 50° C. and 150° C., so that the reaction is completed within about one to about six hours. Again, the temperature should be maintained below about 180° C. so that the epoxy oxiranes do not become reactive, and preferably below 150° C.

With either the block or random mode of preparation, the amount of epoxy compound and elastomer grafted polyol should be selected to obtain the desired balance of flexibility, strength and impact characteristics. Too great a quantity of the elastomer grafted polyol will result in a cured resin having good flexibility and impact properties, but poor strength and reduced elevated temperature properties. Too great a quantity of the epoxy compound will produce a cured resin having poor flexibility and reduced peel strength and impact properties.

While the correct balance of epoxy compound and elastomer grafted polyol can be readily determined by those of ordinary skill in the art without undue experimentation, epoxy resin compositions suitable for use with the present invention are derived from the combination of from about 1 to about 50 weight percent of the elastomer grafted polyol and from about 10 to about 90 weight percent of the epoxy compound. Preferred epoxy resin compositions are derived from about 5 to about 40 weight percent of the elastomer grafted polyol and from about 20 to about 85 weight percent of the epoxy compound. More preferably, epoxy resin compositions are derived from about 10 to about 25 weight percent of the elastomer grafted polyol and from about 60 to about 80 weight percent of the epoxy compound.

The quantity of bi-functional linker compound utilized should be selected so as not to exceed the total reactive equivalency of the elastomer grafted polyol and epoxy compound. That is, the total number of reactive functional groups in the quantity of bi-functional linker compound should not exceed the total quantity of polyol hydroxyl groups and available reactive substituents and points of unsaturation of the epoxy compound.

For example, when the epoxy compound is a hydroxyl-containing epoxy compound and the bi-functional linker compound is a diisocyanate, the total hydroxyl equivalency of the elastomer grafted polyol and the hydroxyl-substituted epoxy should equal or exceed the isocyanate equivalence. Excess isocyanate is undesirable because it will react with moisture in the resulting epoxy resin composition, causing an undesirable increase in viscosity, or even gellation. Therefore, the bi-functional linker compound, particularly when it is a diisocyanate, should be completely consumed by the linkage of the elastomer grafted polyol and the epoxy compound.

More specifically, in a block-type polymerization, two equivalents of isocyanate are reacted with one equivalent of hydroxyl groups of graft polyols to form an isocyanate terminated graft polyol prepolymer. This prepolymer is further reacted with epoxy resin hydroxyl groups, and a sufficient quantity of hydroxyl groups should be present to consume all of the isocyanate groups of the prepolymer. Stated another way, the total isocyanate equivalence should be double the amount of hydroxyl equivalence of the graft polyol, and the total isocyanate equivalence of the resulting prepolymer should not exceed the hydroxyl equivalence of the epoxy. With the random mode of preparation, the isocyanate equivalence should not exceed the combined hydroxyl equivalence of the graft polyol and the epoxy resin.

Up to about three parts by weight of catalyst such as zinc napthanate can be optionally added to the reaction mixture to promote the hydroxyl-isocyanate reaction. Other well-known organometallic complexes of tin, mercury, cobalt, and the like can also be utilized.

Typically, when the bi-functional linker compound is a diisocyanate, levels of diisocyanate up to about 30 weight percent are suitable for use with the present invention. Levels of diisocyanate between about 0.10 and about 15 weight percent are preferred, and levels between about 1 and about 8 weight percent are even more preferred.

In addition to art-recognized stabilizers and catalysts, the reaction mixtures for either mode of preparation may also include art-recognized additives such as diluents selected from glycidyl ethers, such as Butylgtycidyl ether, Cresyl glycidyl ether, Phenyl glycidyl ether and the like, epoxidized castor oil, epoxidized polyoxy propylene glycols, and the like.

It is acknowledged that by either mode of preparation, the potential exists for the bi-functional linker compound to crosslink individual elastomer grafted polyols. Such crosslinking, however, is kept to a minimum using the block polymerization method. A third mode of preparation in which the epoxy compound is first reacted with the bi-functional linker compound may also be employed.

The epoxy composition of the invention may be compounded, as is customary with epoxy compositions, by the addition of pigments such as carbon black, clay, calcium carbonate, calcium silicate, silica, glass beads, glass fibers, coloring agents, antioxidants, plasticizers, flame retardants such as antimony trioxide, fillers, extenders, and the like. From about 0.5 to 300 parts of additive per 100 parts of epoxy resin composition may be added.

The following illustrates a preferred embodiment of the invention:

About 0.02 parts by weight of benzoyl chloride, a stabilizer for the elastomer grafted polyol, is added to about 78.01 parts by weight of a diglycidyl ether of Bisphenol A (EPON 828). The two components are mixed until a uniform, homogeneous blend is obtained, about 20 minutes, after which about 2.95 parts by weight of toluene diisocyanate is added. Mixing continues until a uniform blend is once again obtained, about 20 minutes, after which about 19.00 parts by weight of an acrylonitrile/styrene grafted polyol having a molecular weight of about 5,000 is added, followed by about 0.02 parts by weight of zinc napthanate, a catalyst. The reaction mixture is heated with mixing to a temperature of about 95°–100° C. and maintained at this temperature until the infrared spectrum of the reaction mixture contains no isocyanate absorbance peak, indicating that the TDI has been consumed. This occurs typically within about two to about eight hours. The reaction mixture, which now has a stable dispersed second phase of polyacrylonitrile and polystyrene graft polymer, is then recovered and stored for subsequent curing.

The epoxy resin composition of the invention can be cured by a variety of curing agents that are described, together with the method for calculating the amount to be used, in the above-cited book by Lee and Neville, "Epoxy Resins." Useful curing agents include amines such as ethylene diamine, diethylene triamine, aminoethylethanolamine, polyamides, amidoamines, polyglycol diamines, polyoxypropylene diamines, polyethylene diamines, and the like, diaminodiphenyl-sulfone, dicyandiamide, organic acids such as adipic acid, fatty acids and the like, acid anhydrides such as phthalic anhydride, chlorendic anhydride, methyl tetrahydrophthalic anhydride, dodecenyl succinic anhydride and the like, hydroxyl and phenolic containing materials such as phenol-formaldehyde resins, polyols and the like, and boron-halide complexes, $BF_3$ and $BCl_3$ amines, amine-epoxy adducts, imidazoles and the like.

Generally, a mixture of epoxy compositions and curing agent in stoichiometric amounts (i.e., one active amine hydrogen or other reactive group on the curing agent for each epoxy oxirane group) can be cured by reacting at room temperature (about 25° C.) for a few days to 200° C. for 20 minutes, depending upon the particular epoxide compound, curing agent and the amount of material being used. The selection of temperature and curing time can be readily determined by the ordinarily skilled artisan without undue experimentation.

The epoxy compositions can also be cured by catalytic agents that are either thermally activated or photoactivated. Examples of the thermally activated catalytic agents include $BF_3$-amine complexes, dicyanodiamide, benzyldimethylamine and trimethylamine. Examples of photoactivated catalysts include 4-chloro-benzene-diazonium hexafluorophosphate, diphenyliodonium hexafluoroarsenate and triphenyl hexafluoroarsenate. Other photoactivated catalysts are well-known and are taught in U.S. Pat. Nos. 4,039,521, 4,069,955 and 4,076,536.

When a thermally activated catalyst is employed, from about 0.01 to about 20% by weight, preferably 0.5 to 5 percent by weight, of catalysts based on the epoxy composition is used. Within these catalysts concentrations, curing can be made to proceed using lower temperatures (e.g., down to −10° C.) or elevated temperatures (e.g., 30° C. to 200° C., preferably 50° C. to 100° C.) to either subdue the exotherm of polymerization or to accelerate the polymerization.

When a photoactivated catalyst is used, 0.01 to about 10 percent by weight of catalyst, based on the epoxy composition, is used. Curing is effected by exposing the catalyzed composition to any source of radiation-emitting actinic radiation at a wavelength within the visible and ultraviolet spectral regions. Suitable sources of radiation include mercury vapor, xenon, carbon arc, sunlight, etc. Exposures may be from less than about one second to 10 minutes or longer, depending upon the particular epoxide compound, the photoactivator, the specific source, the distance from the source, and the thickness of the composition to be cured.

The epoxy compositions of the invention can be used for any of the applications for which epoxy resins are normally used. This includes coatings, adhesives, caulkings, sealing, molding, potting, and encapsulating compositions. The compositions of the invention can also be used as impregnating compositions for fibers of glass, graphite, boron, ceramic and KEVLAR®, etc., all providing fiber-reinforced composites, depending on the particular epoxy compound and additives employed. The present compositions are particularly well-adapted for one-part, cured-in-place, applications.

The following non-limiting examples set forth hereinbelow illustrate certain aspects of the present invention. They are not to be considered limiting as to the scope and nature of the present invention. Lap shear measurements were performed in accordance with ASTM-D-1002 and T-Peel measurements were performed in accordance with ASTM D-1876-72 (1983). All parts and percentages are by weight unless otherwise noted, and all temperatures are in degrees Celsius.

EXAMPLES

Epoxy curing agents having the following formulations were used in the examples:

| Ingredient | A | B | C |
|---|---|---|---|
| Polyglycol Diamine | 60.48 | — | — |
| Piperidine | — | 100.00 | — |
| DMP-30 | — | — | 100.00 |
| Silica | 39.50 | — | — |
| Antifoam 100 FG | 0.02 | — | — |

DMP-30 is 2,4,6-tris[(dimethylamino)methyl] phenol, and is manufactured by Rohm and Haas and others.

Epoxy resin formulations were prepared according to the following Examples. Physical properties of the epoxy resins are reported in Table I following the Examples.

EXAMPLE 1—Block Polymerization Method

A prepolymer was prepared by reacting 9 parts by weight of toluene diisocyanate (TDI) (Dow Chemical) with 91 parts by weight of NIAX 24–32, an acrylonitrile/styrene copolymer graft polyol having a molecular weight of 2,800 and manufactured by Union Carbide (now ARCO). This combination represents two equivalents of isocyanate to one equivalent of hydroxyl groups. The two ingredients were reacted at 90° C. with mixing for 2 hours. The resulting prepolymer exhibited a viscosity of 30,000 cps. at 25° C.

The prepolymer was reacted with an epoxy blend in accordance with the formulation set forth below:

| EPON 828 | 74.98 |
|---|---|
| EPON 1001 | 2.0 |
| Prepolymer | 23.0 |
| Zinc Napthanate | 0.02 |

EPON 828, a diglycidyl ether of Bisphenol A, and EPON 1001, a higher molecular weight diglycidyl ether of Bisphenol A, both of which are manufactured by Shell Chemical, were blended together at 95° C. for 1 hour to form a uniform, homogeneous mixture. The mixture was then cooled to 35° C. and the prepolymer was added to this mixture and catalyzed with zinc napthanate. The mixture was then reacted for 3 hours at 100° C. Once complete reaction of the isocyanates was confirmed by infrared spectroscopy, the reaction mixture was then cooled and the reaction product recovered. The viscosity, epoxy equivalent weight and specific gravity of the reaction product are listed in Table I. Other physical properties are listed in Table II.

EXAMPLE 2— Random Polymerization Method

A composition of the present invention was prepared in a single step reaction by combining the following ingredients:

| EPON 828 | 71.11 |
|---|---|
| HELOXY MK 107 | 5.00 |
| EPON 1001 | 1.90 |
| Benzoyl Chloride | 0.02 |
| TDI | 2.95 |
| PLURACOL 1117 | 19.00 |
| Zinc Napthanate 8% | 0.02 |

The EPON 828, EPON 1001 and Heloxy MK 107, a cyclohexane dimethanol diglycidyl ether manufactured by Rhone Poulenc were blended together at 95° C. for a period of 1 hour to dissolve the EPON 1001. The HELOXY MK 107 is a difunctional glycidyl ether that essentially performs in the reaction mixture as a diluent. The mixture was then cooled to 25°–35° C. and the benzoyl chloride was added. After 5 minutes of mixing, TDI was added to the reaction mixture, which was then mixed for 10 minutes at 25°–35° C. PLURACOL 1117 (BASF), an acrylonitrile/styrene copolymer graft polyol having a molecular weight of about 5,000, a hydroxyl equivalent weight of about 2244 and a hydroxyl number of 25, was added and the reaction mixture was catalyzed with the zinc napthanate. The temperature of the reaction mixture was then increased to 90°–95° C. and maintained at this temperature with mixing for 2–3 hours with monitoring of the infrared spectrum of reaction mixture samples for the presence of isocyanate. Once the isocyanate absorbance peak disappeared, the reaction mixture was cooled and the reaction product was recovered. The viscosity, epoxy equivalent weight and specific gravity are listed in Table I. Other physical properties are listed in Table II.

EXAMPLE 3

An epoxy resin formulation was prepared in accordance with the formulation set forth below:

| EPON 828 | 68.03 |
|---|---|
| DEN 438 | 10.00 |
| Benzoyl Chloride | 0.02 |
| TDI | 2.95 |
| PLURACOL 1117 | 19.00 |

The EPON 828, DEN 438, an epoxy novolac resin manufactured by Dow Chemical, benzoyl chloride, TDI and PLURACOL 1117 were blended together in accordance with the procedure set forth in Example 2. However, the reaction mixture was heated to 90°–95° C. without the addition of catalyst. The reaction proceeded without the catalyst and the reaction mixture was maintained at 90°–95° C. with mixing for 2–3 hours as in Example 2 until the presence of isocyanate in the reaction mixture was no longer detectable by infrared spectroscopy. The reaction product was recovered. The physical properties of this reaction product are also listed in Table I and Table II.

EXAMPLE 4

An epoxy resin composition was prepared in accordance with the formulation set forth below:

| EPON 828 | 66.13 |
|---|---|
| EPOTUF 37-001 | 1.90 |
| Benzoyl Chloride | 0.02 |
| TDI | 2.95 |
| PLURACOL 1117 | 19.00 |
| ERL-0500 | 10.00 |

The EPON 828, EPOTUF 37-001, a higher molecular weight diglycidyl ether of Bisphenol A manufactured by Reichold Chemical, benzoyl chloride, TDI and PLURACOL 1117 were reacted together in accordance with the procedure set forth in Example 3, without the addition of catalyst. Once the consumption of TDI was confirmed by infrared spectroscopy, the reaction mixture was cooled down to about 30° C. and the ERL-0500, an aromatic tertiary amine-containing epoxy compound was added to the reaction mixture with mixing until a uniform, homogeneous blend was obtained. The mixture was then recovered. The physical properties for this material are also listed in Table I and Table II.

EXAMPLE 5

An epoxy resin composition having the physical properties listed in Table I and Table II was prepared as in Example 3, substituting ECN 1280, a glycidyl ether of cresol novolac, manufactured by Ciba Geigy, for the DEN 438.

EXAMPLE 6

An epoxy resin composition having the physical properties listed in Table I and Table II was prepared as in Example 2, substituting PLURACOL 973, a acrylonitrile/styrene grafted polyol, having a molecular weight of about 4100 for the PLURACOL 1117.

EXAMPLE 7

The epoxy resin composition of Example 2 was prepared by the method of Example 1 so that the two methods of preparation could be directly compared. (See Table I and Table II).

EXAMPLE 8

A prior art epoxy resin composition was prepared for comparison to the inventive epoxy resin compositions (see Table I and Table II) in accordance with the formulation set forth below:

| | |
|---|---|
| EPON 828 | 71.13 |
| HELOXY MK 107 | 5.0 |
| EPOTUF 37-001 | 1.9 |
| CTBN 1300 X-13 | 21.95 |
| TPP | 0.02 |

The EPON 828 and CTBN 1300 X-13, a carboxy-terminated acrylonitrile-butadiene polymer manufactured by Zeon Chemical, Inc. (previously B. F. Goodrich Co.) were blended together and heated to 80° C. The triphenyl phosphine catalyst (BASF) was added with mixing and the reaction was continued for four hours at 80°–85° C. until all acid was consumed. Then the HELOXY MK 107 and EPOTUF 37-001 were added and mixed until dissolved. The mixture was then recovered. The physical properties for this material are also listed in Table I and Table II.

EXAMPLES 9 and 10

Epoxy resin compositions having the physical properties listed in Table I and Table II were prepared as in Example 2. The composition of Example 9 substituted MONDUR M (MDI) manufactured by Miles Inc. (formerly Mobay) for the TDI. The quantity of diisocyanate was increased to maintain the isocyanate equivalence. The composition of Example 10 slightly decreased the levels of epoxy and diluent while slightly increasing the level of acrylonitrile/styrene copolymer graft polyol. The ingredients of both compositions are listed below:

| EXAMPLE | 9 | 10 |
|---|---|---|
| EPON 828 | 71.13 | 69.97 |
| HELOXY MK 107 | 5.00 | 4.92 |
| EPON 1001 | 1.90 | 1.86 |
| BENZOYL CHLORIDE | 0.02 | 0.02 |
| MONDUR M | 4.23 | 4.23 |
| PLURACOL 1117 | 17.72 | 19.00 |

By using MDI instead of TDI, the difference between the two diisocyanates is illustrated. By varying the levels of epoxy and grafted polyol, the difference between epoxy hydroxyl groups and polyol hydroxyl groups is illustrated. The resulting difference in the physical properties of the recovered reaction mixtures are listed in Table I and Table II.

EXAMPLE 11

Example 11 also illustrates a prior art epoxy resin composition that was prepared for comparison to the inventive epoxy resin compositions. (See Table I and Table II). The epoxy resin composition of Example 11 was a blend of the following ingredients:

| | |
|---|---|
| EPON 828 | 91.15 |
| HELOXY MK 107 | 6.41 |
| EPON 1001 | 2.44 |

The physical properties of this epoxy resin composition are also listed in Table I and Table II.

TABLE I

| Example | Viscosity, 25° C. cps | EEW | Sp. Gr. |
|---|---|---|---|
| 1 | 45,000 | 250 | 1.13 |
| 2 | 70,000 | 245 | 1.13 |
| 3 | 196,000 | 240 | 1.15 |
| 4 | 178,000 | 284 | 1.15 |
| 5 | 808,000 | 248 | 1.15 |
| 6 | 72,000 | 245 | 1.14 |
| 7 | 156,000 | 245 | 1.13 |
| 8 | 71,000 | 249 | 1.08 |
| 9 | 152,000 | 245 | 1.14 |
| 10 | 188,000 | 248 | 1.14 |
| 11 | 9,400 | 191 | 1.16 |

With respect to the physical properties listed in Table I, this lists the viscosity in centipoise at 25° C., the epoxy equivalent weight (EEW) and the specific gravity of the epoxy resin compositions of Examples 1–11.

The epoxy resin composition of Examples 1–11 were then cured and the lap sheer and T-Peel properties were measured by ASTM testing methods. The epoxy resins of Examples 1–11 were each cured with Curing Agent A listed above. Samples of the epoxy resin composition of Example 8 were also cured with Curing Agents B and C. In Table II, "ratio" refers to the ratio of epoxy resin composition to curing agent. The lap sheer and T-Peel properties are listed below:

TABLE II

| Example | Curing Agent | Ratio | Cure Schedule | LAP SHEER −40° C. | LAP SHEER 25° C. | LAP SHEER 82° C. | T-PEEL −40° C. | T-PEEL 25° C. | T-PEEL 82° C. |
|---|---|---|---|---|---|---|---|---|---|
| 1 | A | 100:37 | 7 days 25° C. | 3105 | 3555 | 600 | 4.8 | 35.0 | 9.3 |
| 2 | A | 100:37 | 7 days 25° C. | 5235 | 3618 | 614 | 40.4 | 37.3 | 10.1 |
| 3 | A | 100:38 | 7 days 25° C. | 4421 | 3922 | 1347 | 22.8 | 15.3 | 8.7 |
| 4 | A | 100:32 | 7 days 25° C. | 4192 | 4527 | 492 | 15.13 | 21.4 | 8.5 |
| 5 | A | 100:37 | 7 days 25° C. | 4144 | 4028 | 1487 | 8.16 | 12.25 | 8.67 |
| 6 | A | 100:37 | 7 days 25° C. | 3930 | 3275 | 604 | 8.5 | 25 | 4.4 |
| 7 | A | 100:37 | 7 days 25° C. | 5014 | 3514 | 515 | 36.1 | 18.8 | 9.0 |

TABLE II-continued

| Example | Curing Agent | Ratio | Cure Schedule | LAP SHEER -40° C. | 25° C. | 82° C. | T-PEEL -40° C. | 25° C. | 82° C. |
|---|---|---|---|---|---|---|---|---|---|
| 8 | A | 100:36.5 | 7 days 25° C. | 3941 | 2966 | 592 | 6.9 | 7.33 | 4.62 |
| 8 | B | 100:5 | 4 hours 100° C. | 2565 | 3281 | 1066 | 7.6 | 6.56 | 4.5 |
| 8 | C | 100:5 | 2 hours 100° C. | 2940 | 3102 | 2225 | 7.4 | 2.9 | 2.7 |
| 9 | A | 100:37 | 7 days 25° C. | 5178 | 3783 | 635 | 27.0 | 24 | 5.1 |
| 10 | A | 100:36.7 | 7 days 25° C. | 5407 | 3783 | 444 | 32.9 | 22.8 | 7.75 |
| 11 | A | 100:47.65 | 7 days 25° C. | 1611 | 2016 | 454 | 4.5 | 3.3 | 4.3 |

The above data illustrates the improved sheer strength and peel strength properties of the epoxy resin compositions of the present invention resulting from the uniform, stable elastomeric phase that is incorporated into the epoxy resin compositions prior to curing by covalently linking elastomer grafted polyols and epoxy compounds. The covalent linking maintains the stability of the elastomeric phase after the addition of the curing agent over a wide range of curing temperatures. Prior art compositions do not form an elastomeric phase until the curing reaction, resulting in a less stable phase with reduced flexibility, strength and impact characteristics.

The foregoing description of the preferred embodiment should be taken as illustrating, rather than as limiting the present invention as defined by the claims. Numerous variations and combinations of the features described above can be utilized without departing from the present invention.

What is claimed is:

1. A high strength curable room temperature liquid resin composition formed by covalently linking an elastomer grafted polyol with a polyisocyanate compound to an epoxy compound having an oxirane group, wherein said elastomer grafted polyol has a number-average molecular weight between about 400 and about 6,500 and is prepared from polyols containing from 2 to 8 hydroxyl groups, wherein said precursor epoxy compound has a functional group other than an oxirane capable of reacting with said polyisocyanate compound and a number-average molecular weight less than about 1,000, wherein the covalent linkage is not formed by reaction with an oxirane group, and wherein said resin composition is prepared by reacting from 1 to about 50 percent by weight of said elastomer grafted polyol, from about 20 to about 90 percent by weight of said precursor epoxy compound and from about 0.1 to about 30 percent by weight of said polyisocyanate compound.

2. The resin composition claim 1, wherein said precursor epoxy compound is a diglycidyl ether of a diphenol.

3. The resin composition of claim 2, wherein said diglycidyl ether is derived from a diglycidyl ether of Bisphenol A.

4. The resin composition of claim 1, wherein said elastomer grafted polyol comprises an elastomer of a monomer selected from the group consisting of acrylonitrile, styrene, butadiene, vinyl and allyl monomers.

5. The resin composition of claim 4, wherein said elastomer grafted polyol comprises an acrylonitrile/styrene grafted polyol.

6. The resin composition of claim 5, wherein said acrylonitrile/styrene grafted polyol has an acrylonitrile to styrene ratio of about 1:1.

7. The resin composition of claim 1, wherein said precursor epoxy compound has a hydroxyl group and said elastomer grafted polyol is covalently linked to said hydroxyl group of said epoxy compound via said polyisocyanate compound.

8. The resin composition of claim 7, wherein said polyisocyanate compound comprises a polymeric isocyanate compound containing up to 25 carbon atoms.

9. The resin composition of claim 7, wherein said polyisocyanate compound comprises a diisocyanate compound having the formula:

$$O=C=N-R-N=C=O$$

in which R is selected from the group consisting of branched or straight-chained alkylene, cycloalkylene, arylene, alkylarylene and heteroarylene (having O and/or N heteroatoms).

10. The resin composition of claim 9, wherein said diisocyanate compound is toluene diisocyanate or diphenyl methane diisocyanate.

11. The resin composition of claim 9, prepared by reacting from about 5 to about 40 percent by weight of said elastomer grafted polyol, from about 20 to about 85 percent by weight of said epoxy compound and from about 0.1 to about 15 percent by weight of said diisocyanate.

12. The resin composition of claim 11, prepared by reacting from about 10 to about 25 percent by weight of said elastomer grafted polyol, from about 60 to about 80 percent by weight of said epoxy compound and from about 1 to about 8 percent by weight of said diisocyanate.

13. The resin composition of claim 9, wherein said epoxy compound is a diglycidyl ether of a diphenol.

14. The resin composition of claim 13, wherein said diglycidyl ether is a diglycidyl ether of Bisphenol A.

* * * * *

UNITED STATES PATENT AND TRADEMARK OFFICE
CERTIFICATE OF CORRECTION

PATENT NO.   :   5,521,262

DATED        :   May 28, 1996

INVENTOR(S)  :   Patel et al.

It is certified that error appears in the above-identified patent and that said Letters Patent is hereby corrected as shown below:

Column 6, line 64, "Butylgtycidyl" should read --Butylglycidyl--.

Column 7, line 29, "reaction-mixture" should read --reaction mixture--.

Column 8, line 41, "ASTM-D-1002" should read --ASTM D-1002--.

Signed and Sealed this

Third Day of September, 1996

Attest:

BRUCE LEHMAN

Attesting Officer

Commissioner of Patents and Trademarks